United States Patent
Yoo et al.

(10) Patent No.: US 10,424,774 B2
(45) Date of Patent: Sep. 24, 2019

(54) RECHARGEABLE BATTERY

(71) Applicant: SAMSUNG SDI CO., LTD., Yongin-si, Gyeonggi-do (KR)

(72) Inventors: Seung-Yeol Yoo, Yongin-si (KR); Hui-Jun Lee, Yongin-si (KR); Jong-Seok Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 486 days.

(21) Appl. No.: 14/977,491

(22) Filed: Dec. 21, 2015

(65) Prior Publication Data
US 2016/0359159 A1    Dec. 8, 2016

(30) Foreign Application Priority Data

Jun. 3, 2015   (KR) ..................... 10-2015-0078603

(51) Int. Cl.
*H01M 2/30*    (2006.01)
*H01M 2/06*    (2006.01)
*H01M 2/04*    (2006.01)

(52) U.S. Cl.
CPC ............... *H01M 2/30* (2013.01); *H01M 2/06* (2013.01); *H01M 2/043* (2013.01); *H01M 2/305* (2013.01)

(58) Field of Classification Search
CPC .......... H01M 2/30; H01M 2/06; H01M 2/043; H01M 2/305
See application file for complete search history.

(56) References Cited

U.S. PATENT DOCUMENTS

| 8,524,390 B2 | 9/2013 | Guen | |
| 2006/0204842 A1* | 9/2006 | Cho | H01M 2/021 429/181 |
| 2011/0195296 A1* | 8/2011 | Kim | B23K 20/122 429/151 |
| 2012/0058388 A1* | 3/2012 | Kim | H01M 2/266 429/179 |

FOREIGN PATENT DOCUMENTS

| KR | 10-2011-0109843 A | 10/2011 |
| KR | 10-1175014 B1 | 8/2012 |

* cited by examiner

*Primary Examiner* — Ula C Ruddock
*Assistant Examiner* — Matthew W Van Oudenaren
(74) *Attorney, Agent, or Firm* — Lewis Roca Rothgerber Christie LLP

(57) ABSTRACT

A rechargeable battery includes: a case having a receiving space at the inside thereof and having an opening; an electrode assembly accommodated in the receiving space of the case and including a first electrode and a second electrode; a cap plate at the opening of the case; and a terminal assembly at the cap plate, wherein the terminal assembly includes a terminal plate electrically connected to the first electrode, a terminal post extending through the terminal plate and the cap plate, an end of the terminal post being connected to the first electrode, and a bonding member between the terminal post and the terminal plate.

14 Claims, 10 Drawing Sheets

RECHARGEABLE BATTERY

CROSS-REFERENCE TO RELATED APPLICATION

This application claims priority to and the benefit of Korean Patent Application No. 10-2015-0078603 filed in the Korean Intellectual Property Office on Jun. 3, 2015, the entire content of which is incorporated herein by reference.

BACKGROUND

1. Field

The present disclosure relates to a rechargeable battery.

2. Description of the Related Art

A rechargeable battery differs from a primary battery in that a rechargeable battery can be repeatedly charged and discharged, while the latter is incapable of being recharged. A small-capacity rechargeable battery is used for small portable electronic devices such as mobile phones, laptop computers, camcorders, and the like, and a large-capacity rechargeable battery is used as a power source for driving a motor of a hybrid electric vehicle (HEV) or the like, or as a large-capacity power storage device.

A rechargeable battery is configured with a case, an electrode assembly installed inside the case, a cap plate formed on an upper portion of the case, and a terminal assembly formed at the cap plate and connected to the electrode assembly.

The terminal assembly includes a terminal plate made of a metal material, and an electrode portion which is combined with the terminal plate, one end of which is connected to the electrode assembly.

A portion of the electrode portion that is connected to the electrode assembly is made of copper and another portion of the electrode portion combined with the terminal plate is made of aluminum, and then two portions made of different metals are bonded to each other.

Because the electrode portion is formed by bonding different metals, the manufacturing cost increases and manufacturing processes are complicated.

The above information disclosed in this Background section is only to enhance the understanding of the background of the present disclosure and therefore it may contain information that does not form the prior art.

SUMMARY

Embodiments of the present disclosure are directed to a rechargeable battery having a relatively simple manufacturing process.

According to one or more exemplary embodiments of the present disclosure, a rechargeable battery includes: a case having a receiving space at the inside thereof and having an opening; an electrode assembly accommodated in the receiving space of the case and including a first electrode and a second electrode; a cap plate at the opening of the case; and a terminal assembly at the cap plate, wherein the terminal assembly includes a terminal plate electrically connected to the first electrode, a terminal post extending through the terminal plate and the cap plate, an end of the terminal post being connected to the first electrode, and a bonding member between the terminal post and the terminal plate.

The terminal post and the terminal plate may include different metals.

The bonding member may include a metal that is the same as a metal of the terminal plate and/or an alloy including the metal.

The terminal plate may include aluminum (Al) and the bonding member may include an aluminum-silicon alloy.

The terminal post may include a head portion on a portion of the terminal plate, a body portion connected to the head portion and having a smaller diameter than a diameter of the head portion, and a connecting portion, a first side of the connecting portion being connected to the body portion and a second side of the connecting portion being connected to the first electrode.

The bonding member may surround the head portion of the terminal post.

The terminal plate may define a first opening having a larger diameter than the diameter of the head portion and having a depth corresponding to a thickness of the head portion, a second opening connected to the first opening and having a diameter corresponding to the diameter of the body portion, and a terminal plate-mounting surface between the first opening and the second opening, the head portion being on the terminal plate-mounting surface.

The bonding member may surround the body portion of the terminal post.

The bonding member may have an exterior diameter corresponding to the diameter of the head portion.

The terminal plate may define a first opening having a diameter corresponding to the diameter of the head portion and a depth corresponding to a sum of a thickness of the head portion and a thickness of the bonding member, a second opening connected to the first opening and having a diameter corresponding to the diameter of the body portion, and a terminal plate-mounting surface between the first opening and the second opening, the bonding member being on the terminal plate-mounting surface.

The terminal assembly may include an insulating member between the terminal plate and the cap plate, the terminal post extending through the insulating member.

The connecting portion may have a smaller diameter than the diameter of the body portion, and a portion of the body portion may be partially stopped on the insulating member.

An external circumferential surface of the terminal post may include first threads and an interior circumference of the bonding member may include second threads configured to engage with the first threads.

The bonding member may have an O-ring shape.

The terminal post, the bonding member, and the terminal plate may be welded to one another by laser welding.

The terminal assembly may be provided as a pair of terminal assemblies having different polarities.

According to one or more exemplary embodiments of the present disclosure, because a terminal post and a terminal plate of a rechargeable battery are combined by a bonding member, the manufacturing process of the rechargeable battery may be relatively simple and the manufacturing cost thereof may be reduced.

DETAILED DESCRIPTION

Figure 1:
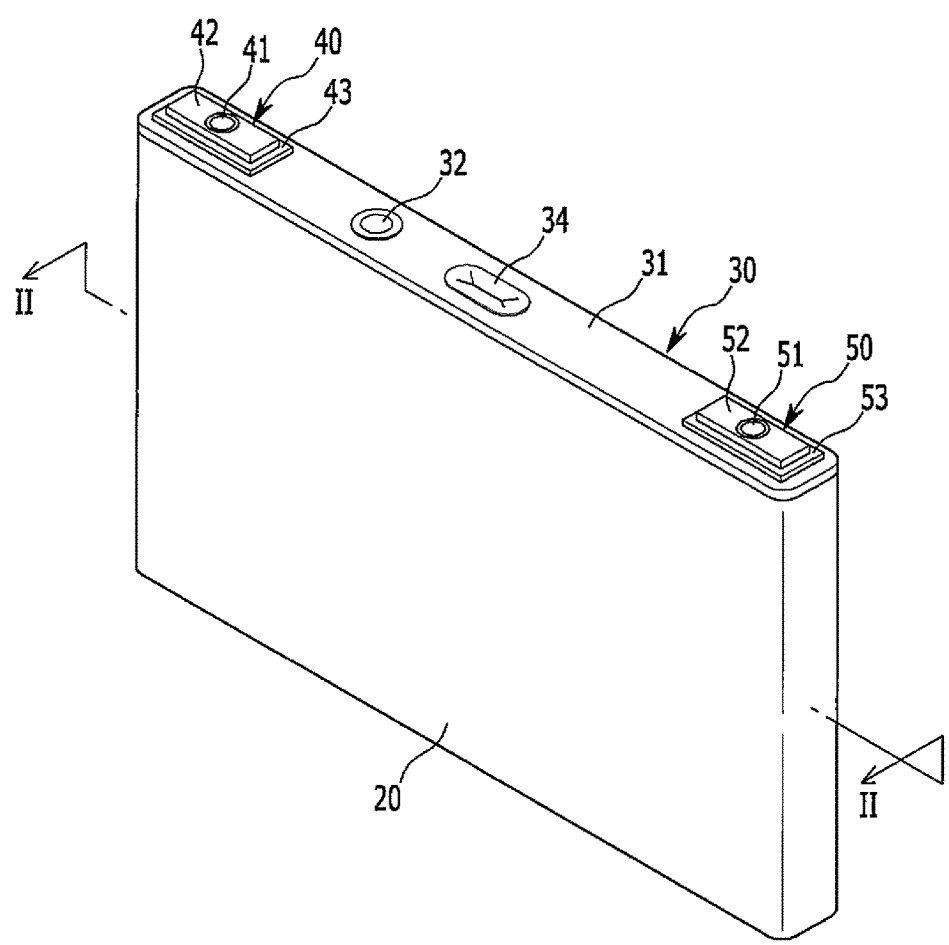
FIG. 1 illustrates a perspective view of a rechargeable battery according to one or more exemplary embodiments of the present disclosure.

Hereinafter, one or more exemplary embodiments of the present invention are described in detail with reference to the attached drawings such that the present invention can be easily put into practice by those skilled in the art. As those skilled in the art would realize, the described embodiments may be modified in various different ways, all without departing from the spirit or scope of the present disclosure. The drawings and description are to be regarded as illustrative in nature and not restrictive. Unless otherwise noted, like reference numerals designate like elements throughout the specification. In addition, the size and thickness of each component shown in the drawings may be exaggerated for better understanding and ease of description.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, throughout the specification, "on" implies being positioned above or below a target element and does not imply being necessarily positioned on the top on the basis of a gravity direction.

It will be understood that when an element or layer is referred to as being "on" or "connected to" another element or layer, it can be directly on or connected to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Figure 2:
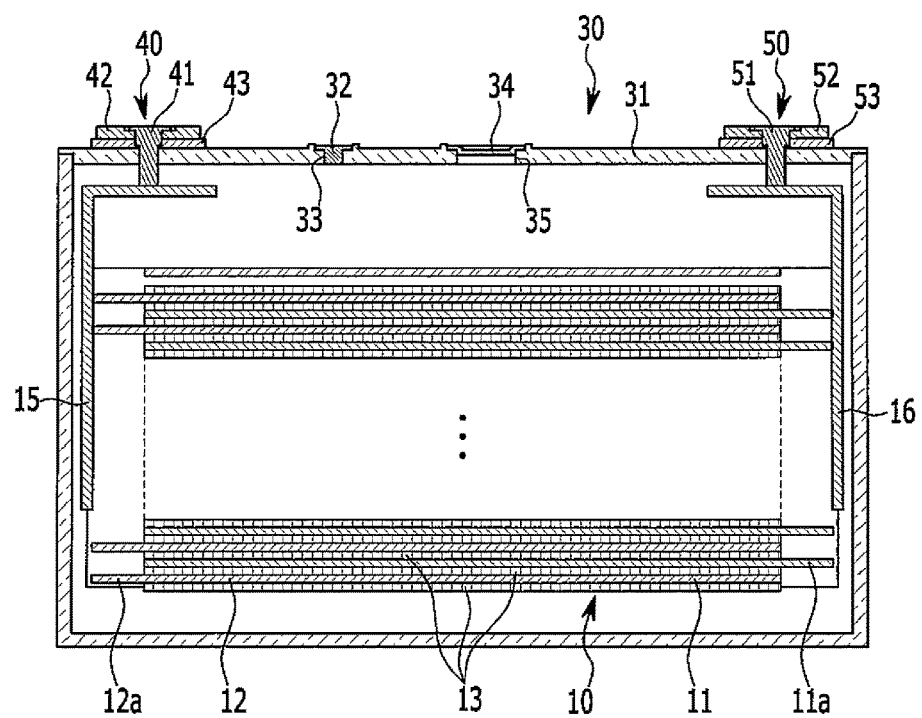
FIG. 2 illustrates a cross-sectional view of the rechargeable battery of FIG. 1 taken along the line II-II of FIG. 1.

FIG. 1 illustrates a perspective view of a rechargeable battery according to one or more exemplary embodiments of the present disclosure, and FIG. 2 illustrates a cross-sectional view taken along the line II-II of FIG. 1.

Referring to FIGS. 1-2, a rechargeable battery 1 according to one or more exemplary embodiments of the present invention includes an electrode assembly 10, a case 20, a cap plate 30, a first terminal assembly 40, and a second terminal assembly 50.

A space (e.g., a receiving space) is formed inside the case 20, and one side of the case 20 is open (e.g., has an opening).

The electrode assembly 10 is provided in the receiving space of the case 20. The electrode assembly 10 includes a first electrode 11, a second electrode 12, and a separator 13.

The electrode assembly 10 may be formed in a jelly-roll form by winding the first electrode 11 and the second electrode 12, with the separator 13 therebetween. The first electrode 11 and the second electrode 12 of the electrode assembly 10 according to one or more exemplary embodiments of the present invention have different polarities. The first electrode 11 and the second electrode 12 may include a first current collecting member 15 and a second current collecting member 16, respectively.

A portion of the first current collecting member 15 and a portion of the second current collecting member 16 are adjacent to the opening of the case 20 and are formed to have a bent shape.

Each of the first electrode 11 and the second electrode 12 may include a current collector made of a thin metal plate foil and an active material coated on a surface of the current collector.

Specifically, the first and second electrodes 11 and 12 may each be divided into coated regions where the active material is coated on the respective current collector, and a first electrode uncoated region 11a and a second electrode uncoated region 12a that are respectively disposed at opposite ends of the coated regions and where the active material is not coated on the respective current collector.

However, the electrode assembly 10 is not limited to the jelly-roll shape. For example, in some embodiments, the electrode assembly 10 may have a structure in which the first and second electrodes 11 and 12 are formed of a plurality of sheets and are layered with the separator 13 interposed therebetween.

The cap plate 30 is provided at the opening of the case 10 to block the receiving space formed inside the case 10 from the outside.

The cap plate 30 may include a cap plate body 31 having a plate shape, an electrolyte injection opening 33 and a vent opening (or vent hole) 35 through the cap plate 30, a sealing cap 32 for sealing the electrolyte injection opening 33, and a vent plate 34 that is configured to break when internal pressure of the case 26 exceeds a predetermined pressure. The vent plate 34 is provided at the vent hole 35.

The first terminal assembly 40 and the second terminal assembly 50 are electrically connected to the first current collecting member 15 and the second current collecting member 16, respectively, and are spaced apart from each other to be installed in the cap plate body 31.

Hereinafter, a structure of the first terminal assembly 40 is described in detail.

Figure 3:
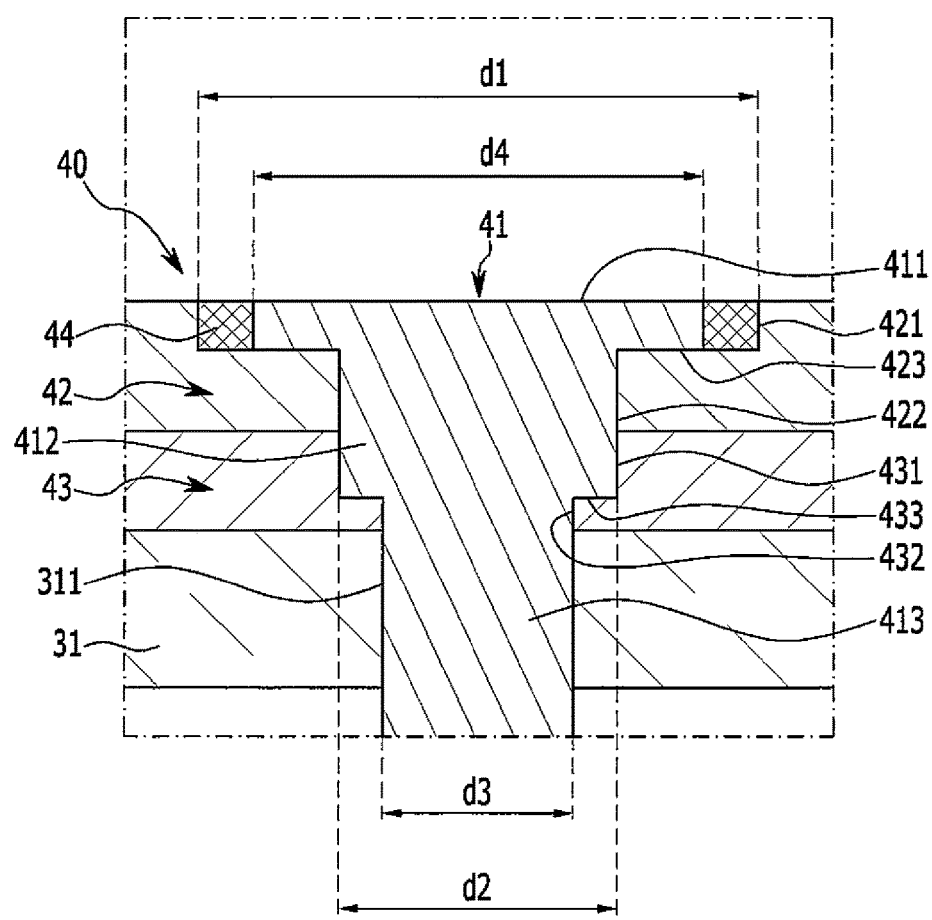
FIG. 3 illustrates a partially enlarged view of FIG. 2.
Figure 4:
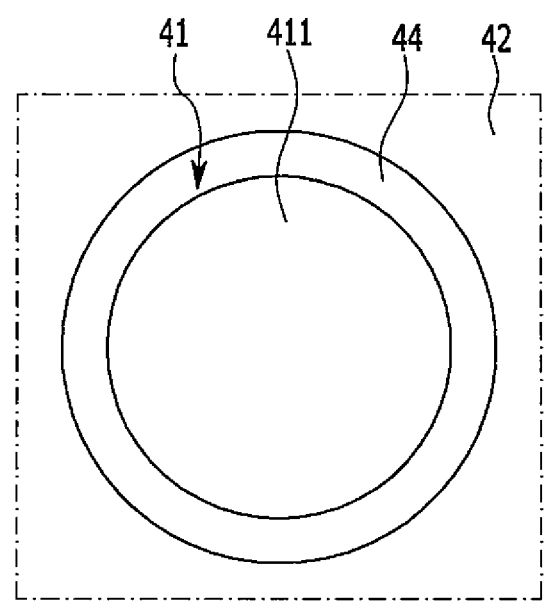
FIG. 4 illustrates a top view of a terminal assembly of FIG. 3.

FIG. 3 illustrates a partially enlarged view of FIG. 2, and FIG. 4 illustrates a top view of the first terminal assembly 40 of FIG. 3.

Referring to FIGS. 3-4, the first terminal assembly 40 includes a terminal plate 42, an insulating member 43, a terminal post 41, and a bonding member 44.

Specifically, the terminal plate 42 may be electrically connected to the first electrode 11, and may be formed with a metal plate that is made of a metal material such as aluminum (Al).

A first opening (e.g., a first hole) 421 having a first diameter d1 and a first depth, a second opening (e.g., a second hole) 422 connected to the first hole 421 and having a second diameter d2 that is smaller than the first diameter d1, and a terminal plate-mounting surface 423 disposed between the first hole 421 and the second hole 422 may be formed in the terminal plate 42.

The first hole 421 and the second hole 422 are concentrically formed with different diameters (e.g., the first and second diameters d1 and d2, respectively). The terminal plate-mounting surface 423 may be defined as an area between a circle forming the first hole 421 and a circle forming the second hole 422 when the terminal plate 42 is viewed from above.

The insulating member 43 may be formed of a non-conductive material between the terminal plate 42 and a top surface of the cap plate body 31, and may connect the terminal plate 42 and the cap plate 30.

A third opening (e.g., a third hole) 431 directly contacting the second hole 422 of the terminal plate 42 and having a diameter this is the same as the second diameter d2 of the second hole 422 and having a second depth, a fourth opening (e.g., a fourth hole) 432 connected to the third hole 431 and having a third diameter d3 that is smaller than the second diameter d2 of the third hole 431, and an insulating member-mounting surface 433 disposed between the third hole 431 and the fourth hole 432 are formed in the insulating member 43. In other words, the third hole 431 and the second hole 422 both have the second diameter d2.

The third hole 431 and the fourth hole 432 are concentrically formed with different diameters (e.g., the second and third diameters d2 and d3). The insulating member-mounting surface 433 may be defined as an area between a circle forming the third hole 431 and a circle forming the fourth hole 432 when the insulating member 43 is viewed from above.

The terminal post (or terminal or terminal unit) 41 passes (or extends) through the terminal plate 42, the insulating member 43, and the cap plate 30, and an end portion thereof is partially connected to a bent portion of the first current collecting member 15.

The terminal unit 41 includes a head portion 411, a body portion 412, and a connecting portion 413 that are respectively formed in shapes having circular cross-sections with different diameters, and may be formed of a material such as copper (Cu). The terminal unit 41 and the terminal plate 42 of the rechargeable battery 1 according to one or more exemplary embodiments of the present invention may be respectively formed of different metals.

The head portion 411 has a fourth diameter d4 that is smaller than the first diameter d1 of the first hole 421 of the terminal plate 42, and a thickness in the vertical direction that corresponds to the first depth of the first hole 421. In addition, a surface of the head portion 411 (or a portion of a surface corresponding to a border or a periphery of the head portion 411) is on (or mounted on) the terminal plate-mounting surface 423 of the terminal plate 42.

One side (e.g., a first side) of the body portion 412 is connected to a lower portion of the head portion 411, and the body portion 412 is formed to have a smaller diameter than the head portion 411. In this case, the body portion 412 is formed to have a diameter corresponding to the second diameter d2 of the second hole 422 of the terminal plate 42 and of the third hole 423 of the insulating member 43. In other words, the body portion 412 may be formed to have the second diameter d2. A surface of the body portion 412 (or a portion of a surface corresponding to a border or a periphery of the body portion 412) is on (or mounted on) the insulating member-mounting surface 433 that is formed on the insulating member 43.

One side (e.g., a first side) of the connecting portion 413 is connected to another side (e.g., a second side) of the body portion 412, and another side (e.g., a second side) of the connecting portion 413 is connected to the first current collecting member 15 of the first electrode 11. The connecting portion 413 is formed to have a smaller diameter than the second diameter d2 of the body portion 412. For example, the connecting portion 413 may be formed to have a diameter corresponding to the third diameter d3 of the fourth hole 432 of the insulating member 43. In other words, the connecting portion 413 may be formed to have the third diameter d3.

A cap plate through-hole 311 through which the connecting portion 413 passes (or extends) is formed in the cap plate body 31, and the cap plate through-hole 311 is formed to have a diameter that corresponds to the third diameter d3 of the connecting portion 413.

That is, while being directed downward, the terminal unit 41 is formed in a shape in which the width of the cross-section thereof is reduced stepwise, and a step is formed in an area in which the width of the cross-section is reduced, such that the terminal unit 41 is stopped at the terminal plate 42 and the insulating member 43.

The bonding member 44 may be formed of a metal that is used to form the terminal plate 42 and/or a metal alloy such as an aluminum-silicon alloy.

The bonding member 44 may be disposed between the head portion 411 of the terminal unit 41 and the first hole 421 of the terminal plate 42 to fix (e.g., rigidly fix) the terminal unit 41 to the terminal plate 42 and to electrically connect the terminal unit 41 and the terminal plate 42 to each other.

The bonding member 44 may be formed in a O-ring shape, and an interior diameter of the bonding member 44 may correspond to the fourth diameter d4 of the head portion 411 and an exterior diameter of the bonding member 44 may correspond to the first diameter d1 of the first hole 421.

Although the body portion 412 and the connecting portion 413 of the terminal unit 41 according to one or more exemplary embodiments of the present invention may have different diameters, the present invention is not limited thereto. For example, in some embodiments, the body portion 412 and the connecting portion 413 may be formed to have the same diameter. In some embodiments, the second hole 422 of the terminal plate 42 and the third hole 431 of the insulating member 43 through which the body portion 412 passes and the fourth hole 432 of the insulating member 43 through which the connecting portion 413 passes may be respectively formed to have the same diameter. As such, the mounting surface 433 may not be formed at the insulating member.

Similar to the first terminal assembly 40, the second terminal assembly 50 includes a terminal unit 51, a terminal plate 52, an insulating member 53, and a bonding member. Because a configuration of the second terminal assembly 50 is substantially the same as that of the first terminal assembly 40, additional description thereof is omitted.

A process in which the terminal assemblies of the rechargeable battery 1 according to one or more exemplary embodiments of the present invention are assembled is described below.

Figure 5:
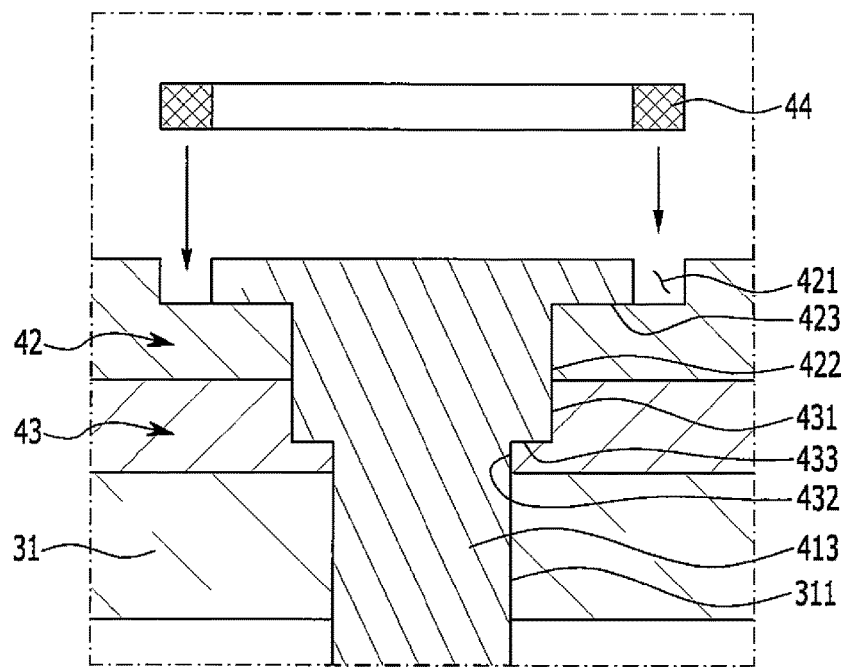
FIGS. 5-6 illustrate a process of assembling the terminal assembly of FIGS. 3-4.
Figure 6:
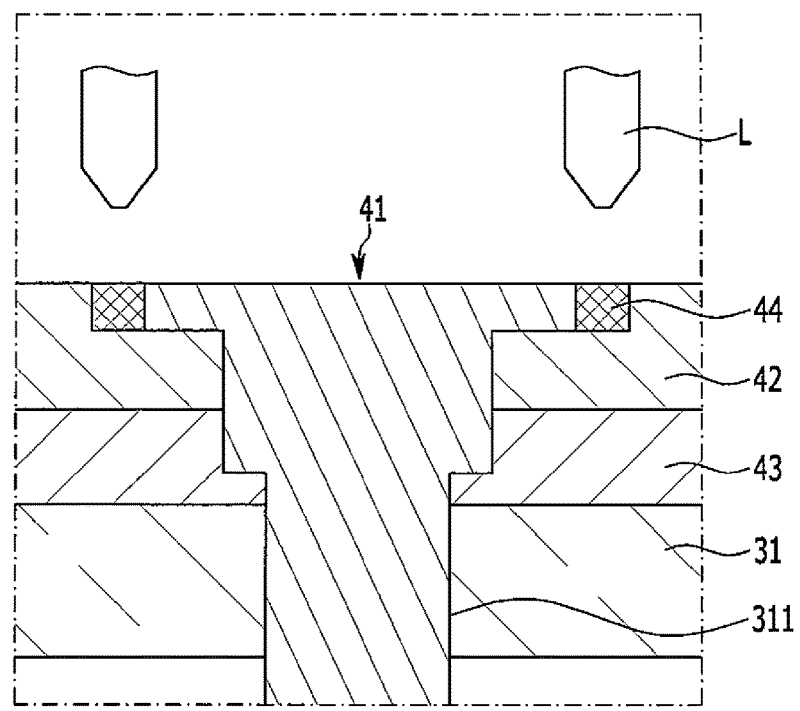

FIGS. 5-6 illustrate a process of assembling the terminal assembly of FIGS. 3-4.

First, referring to FIG. 5, the insulating member 43 and the terminal plate 42 are disposed on a top surface of the cap plate body 31 so that the first hole 421 and the second hole 422 of the terminal plate 42, the third hole 431 and the fourth hole 432 of the insulating member 43, and the cap plate through-hole 311 of the cap plate body 31 may be aligned.

Next, the terminal unit 41 passes through the first hole 421, the second hole 422, the third hole 431, the fourth hole 432, and the cap plate through-hole 311 so that the second side of the connecting portion 413 of the terminal unit 41 may be connected to the first current collecting member 15 of the first electrode 11.

In this case, a surface (e.g., a lower surface) of the head portion 411 and a surface (e.g., a lower surface) of the body portion 412 are respectively on (or mounted on) the terminal plate-mounting surface 413 and the insulating member-mounting surface 423.

Next, the bonding member 44 is inserted between the head portion 411 and the first hole 412. When the bonding member 44 is inserted between the head portion 411 and the first hole 412, the bonding member 44 surrounds the head portion 411.

Next, referring to FIG. 6, in the state in which the bonding member 44 is inserted between the head portion 411 and the first hole 412, the terminal unit 41, the bonding member 44, and the terminal plate 42 may be welded by using a laser welding apparatus L, such that the terminal unit 41 and the terminal plate 42 are electrically and mechanically connected to each other (e.g., rigidly electrically and mechanically connected to each other).

In some embodiments, the bonding member 44 is described as having the O-ring shape, but the present invention is not limited thereto. For example, the bonding member 44 may be provided as a welding pillar to be filled in a space between the terminal unit 41 and the terminal plate 42 and then to be welded so that the terminal unit 41 and the terminal plate 42 are connected to each other.

According to one or more exemplary embodiments of the present invention, because the terminal unit 41 and the terminal plate 42 are connected by the bonding member 44, the manufacturing process of the terminal unit 41 may be simplified and/or the manufacturing cost may be reduced.

Figure 7:
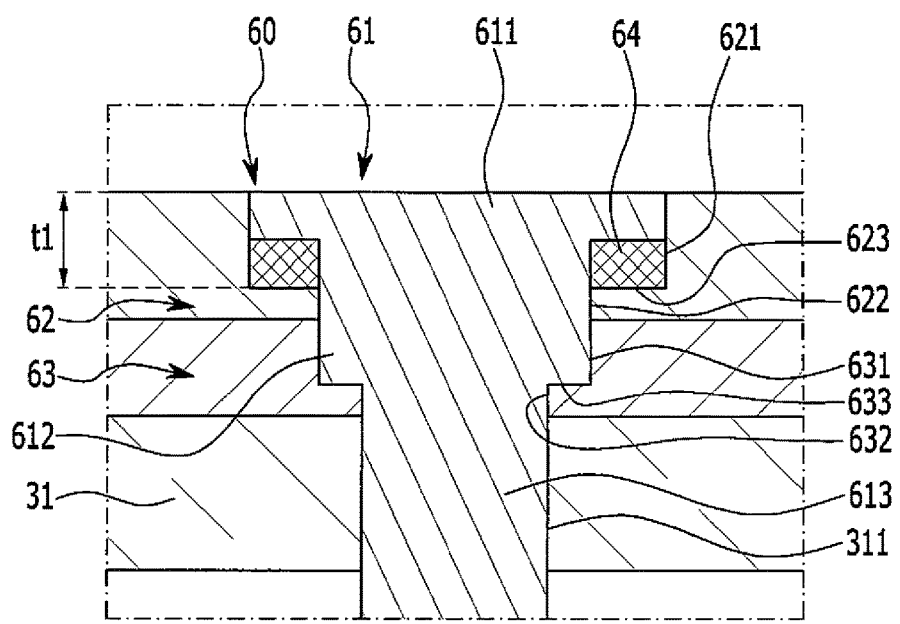
FIG. 7 illustrates a cross-sectional view of a portion of a rechargeable battery according to one or more exemplary embodiments of the present disclosure.
Figure 8:
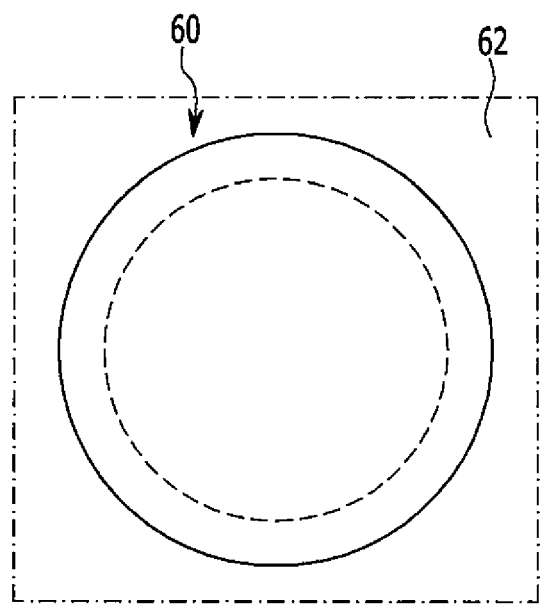
FIG. 8 illustrates a top view of a terminal assembly of FIG. 7.

FIG. 7 illustrates a cross-sectional view of a portion of a rechargeable battery according to one or more exemplary embodiments of the present disclosure, and FIG. 8 illustrates a top view of a terminal assembly of FIG. 7.

In one or more exemplary embodiments of the present invention, because there is a difference in a position where the bonding member 44 is provided in the terminal unit 41 and other configurations are substantially the same as the configuration of the rechargeable battery shown in FIGS. 1-6, hereinafter, different features are mainly described.

Referring to FIGS. 7-8, a terminal assembly 60 according to one or more exemplary embodiments of the present invention includes a terminal unit 61, a terminal plate 62, an insulating member 63, and a bonding member 64. The terminal unit 61 may include a head portion 611 and a body portion 613.

The bonding member 64 may surround a portion of the body portion 613 of the terminal unit 61.

An interior diameter of the bonding member 64 is formed to correspond to a diameter (e.g., an exterior) diameter of the portion of the body portion 613, and an exterior diameter of the bonding member 64 is formed to correspond to a diameter (e.g., an exterior) diameter of the head portion 611.

In a state in which the bonding member 64 surrounds the body portion 613, a top surface of the bonding member 64 contacts a bottom surface of the head portion 611, and a bottom surface of the bonding member 64 contacts a terminal plate-mounting surface 623.

That is, the bonding member 64 is provided between the bottom surface of the head portion 611 and the terminal plate-mounting surface 623.

The head portion 611 and the bonding member 64 are disposed in a first opening (e.g., a first hole) 621 formed in the terminal plate 62.

A diameter of the first hole 621 is formed to correspond to a diameter of the head portion 611, and a depth t1 of the first hole 621 is formed to correspond to a sum of a thickness in the vertical direction of the head portion 611 and a thickness in the vertical direction of the bonding member 64.

A diameter of a second opening (e.g., a second hole) 622 is formed to correspond to the body portion 613, and a step (e.g., the terminal plate-mounting surface 623) is formed between the first hole 621 and the second hole 622 due to a difference between the diameters of the first hole 621 and the second hole 622.

A third opening (e.g., a third hole) 631, a fourth opening *(e.g., a fourth hole) 632, and an insulating member-mounting surface 633 are formed in the insulating member 63, and because a configuration of the insulating member 63 is substantially the same as the configuration of the rechargeable battery shown in FIGS. 1-6, additional description thereof is omitted.

A process of assembling the terminal assembly 60 of the rechargeable battery 1 according to one or more exemplary embodiments of the present invention is described below.

Figure 9:
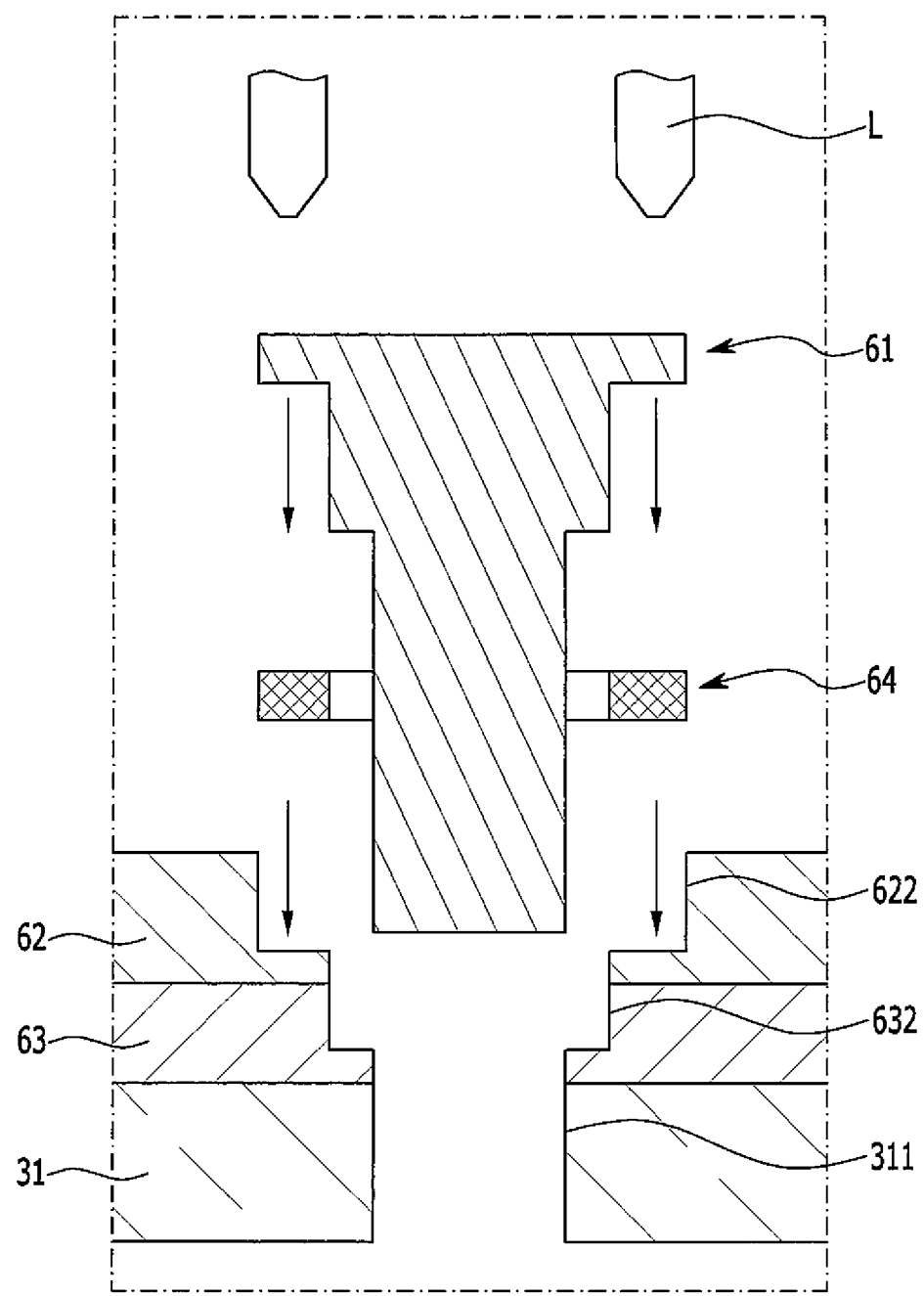
FIG. 9 illustrates a process of assembling the terminal assembly of FIG. 7.

FIG. 9 illustrates a process of assembling the terminal assembly of FIG. 7.

Referring to FIG. 9, first, the terminal unit 61 and the bonding member 64 of the terminal assembly 60 are arranged.

Next, the bonding member 64 is inserted to surround the body portion 613 of the terminal unit 61, and then the terminal unit 61 is inserted in the terminal plate 62 so that the bonding member 64 surrounding the body portion 613 may be mounted on the terminal plate-mounting surface 623.

Next, the terminal unit 61, the bonding member 64, and the terminal plate 62 may be concurrently welded by using the laser welding apparatus L, such that the terminal unit 61 and the terminal plate 62 are electrically and mechanically connected to each other (e.g., rigidly electrically and mechanically connected to each other).

Figure 10:
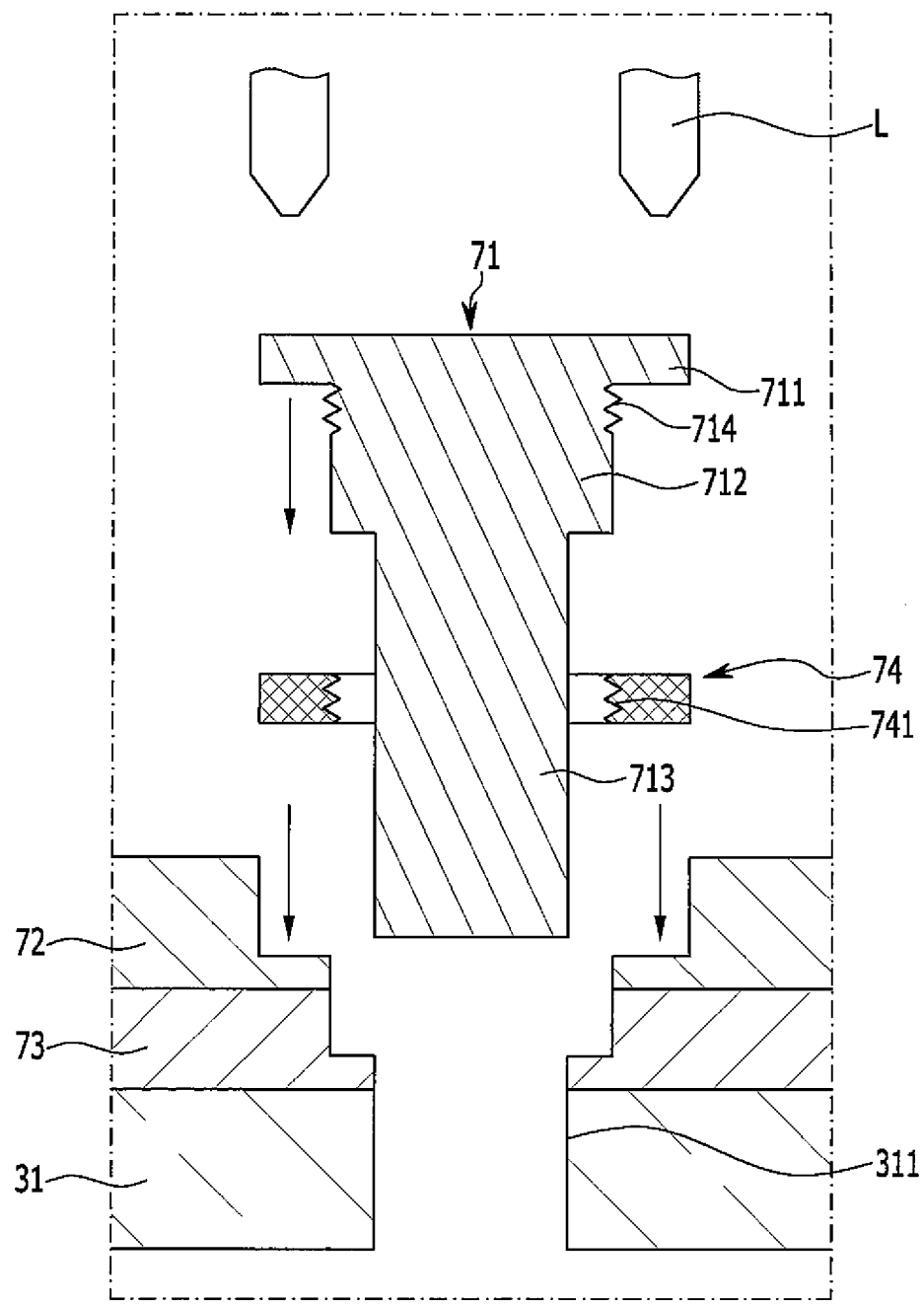
FIG. 10 illustrates a process of assembling a terminal assembly of a rechargeable battery according to one or more exemplary embodiments of the present disclosure.

FIG. 10 illustrates a process of assembling a terminal assembly of a rechargeable battery according to one or more exemplary embodiments of the present disclosure.

In one or more exemplary embodiments of the present invention, because there is a difference in the configuration in which the bonding member 44 and the terminal unit 41 are connected and other configurations are substantially the same as the configuration of the rechargeable battery shown in FIGS. 7-9, hereinafter, different features are mainly described.

Referring to FIG. 10, a terminal assembly according to one or more exemplary embodiments of the present invention may include a terminal unit 71, a terminal plate 72, an insulating member 73, and a bonding member 74. The terminal unit 71 may include a head portion 711, a body portion 712, and a connecting portion 713.

First threads 714 may be formed on a portion of an external circumferential surface of the body portion 712 that is adjacent to the head portion 711, and second threads 741 that are configured to engage with the first threads 714 may be formed on an interior circumference of the bonding member 74.

Accordingly, the bonding member 74 may be inserted to surround the body portion 712 so that the first threads 714 and the second threads 741 engage with each other. Because the terminal unit 71, the bonding member 74, and the terminal plate 72 are welded to one another, matching thereof may be further improved.

In some exemplary embodiments, the first threads 714 may be formed on the head portion 711. In this case, the interior diameter of the bonding member 74 in which the second threads 741 engage with the first threads 714 may be formed to correspond to the exterior diameter of the head portion 711.

While this disclosure has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims and their equivalents.

DESCRIPTION OF SOME OF THE SYMBOLS

| | |
|---|---|
| 1: rechargeable battery | 10: electrode assembly |
| 11: first electrode | 12: second electrode |
| 15: first current collecting member | 16: second current collecting member |
| 20: case | 30: cap plate |
| 40: first terminal assembly | 41: terminal unit |
| 42: terminal plate | 43: insulating member |
| 44: bonding member | 50: second terminal assembly |

What is claimed is:

1. A rechargeable battery comprising:
a case having a receiving space at an inside thereof and having an opening;
an electrode assembly accommodated in the receiving space of the case and comprising a first electrode and a second electrode;
a cap plate at the opening of the case; and
a terminal assembly at the cap plate,
wherein the terminal assembly comprises:
a terminal plate electrically connected to the first electrode;
a terminal post extending through the terminal plate and the cap plate, an end of the terminal post being connected to the first electrode, the terminal post comprising:
a head portion on a portion of the terminal plate;
a body portion connected to the head portion and having a smaller diameter than a diameter of the head portion; and
a connecting portion, a first side of the connecting portion being connected to the body portion and a second side of the connecting portion being connected to the first electrode; and
a bonding member between the terminal post and the terminal plate,
wherein the connecting portion has a smaller diameter than the diameter of the body portion, and
wherein a portion of the body portion is partially stopped on an insulating member.

2. The rechargeable battery of claim 1, wherein the terminal post and the terminal plate comprise different metals.

3. The rechargeable battery of claim 2, wherein the bonding member comprises a metal that is the same as a metal of the terminal plate or an alloy comprising the metal.

4. The rechargeable battery of claim 3, wherein the terminal plate comprises aluminum (Al) and the bonding member comprises an aluminum-silicon alloy.

5. The rechargeable battery of claim 1, wherein the bonding member surrounds the head portion of the terminal post.

6. The rechargeable battery of claim 5, wherein the terminal plate defines:
a first opening having a larger diameter than the diameter of the head portion and having a depth corresponding to a thickness of the head portion;
a second opening connected to the first opening and having a diameter corresponding to the diameter of the body portion; and
a terminal plate-mounting surface between the first opening and the second opening, the head portion being on the terminal plate-mounting surface.

7. The rechargeable battery of claim 1, wherein the bonding member surrounds the body portion of the terminal post.

8. The rechargeable battery of claim 7, wherein the bonding member has an interior diameter corresponding to the diameter of the head portion.

9. The rechargeable battery of claim 7, wherein the terminal plate defines:
a first opening having a diameter corresponding to the diameter of the head portion and a depth corresponding to a sum of a thickness of the head portion and a thickness of the bonding member;
a second opening connected to the first opening and having a diameter corresponding to the diameter of the body portion; and
a terminal plate-mounting surface between the first opening and the second opening, the bonding member being on the terminal plate-mounting surface.

10. The rechargeable battery of claim 1, wherein the insulating member is between the terminal plate and the cap plate, the terminal post extending through the insulating member.

11. The rechargeable battery of claim 1, wherein an external circumferential surface of the terminal post comprises first threads, and
   wherein an interior circumference of the bonding member comprises second threads configured to engage with the first threads.

12. The rechargeable battery of claim 1, wherein the bonding member has an O-ring shape.

13. The rechargeable battery of claim 1, wherein the terminal post, the bonding member, and the terminal plate are welded to one another by laser welding.

14. The rechargeable battery of claim 1, wherein the terminal plate defines a first opening having a first diameter and a second opening having a second diameter, the first diameter being greater than the second diameter,
   and wherein the bonding member is located between the terminal post and the terminal plate at the first opening.

* * * * *